United States Patent [19]

Matsushima

[11] Patent Number: 5,046,256
[45] Date of Patent: Sep. 10, 1991

[54] METHOD OF CONNECTION DRAWING IN AUTOMATIC DRAFTER

[75] Inventor: Toshiaki Matsushima, Tokyo, Japan

[73] Assignee: Mutoh Industries, Ltd., Tokyo, Japan

[21] Appl. No.: 441,152

[22] Filed: Nov. 15, 1989

[30] Foreign Application Priority Data

Dec. 29, 1988 [JP] Japan ................................. 63-332592
Feb. 28, 1989 [JP] Japan ..................................... 1-48362

[51] Int. Cl.$^5$ ........................ B65H 17/36; B43L 13/00
[52] U.S. Cl. ....................................... 33/18.1; 33/1 M
[58] Field of Search ................ 33/18.1, 1 M; 346/118, 346/130; 226/8

[56] References Cited

U.S. PATENT DOCUMENTS 3,844,461 10/1974 Robison et al. .......................... 226/8
4,512,079 4/1985 LeBlond ............................. 33/1 M

FOREIGN PATENT DOCUMENTS 3522426 1/1986 Fed. Rep. of Germany ....... 33/18.1

Primary Examiner—Harry N. Haroian
Attorney, Agent, or Firm—Wenderoth, Lind & Ponack

[57] ABSTRACT

A method of operating an automatic drafter for producing a long drawing having successive parts, in which, after drawing on a long sheet a preceding frame of the drawing corresponding to a preceding part of the long drawing, the area in which the next frame is to be drawn is expanded by moving the leading edge of the area to form a portion overlapping the trailing portion of the preceding frame. Then the lines of the trailing portion of the preceding frame which are to extend across the junction between the successive parts of the sheet in the overlapping portion are redrawn and then continued in the next frame while drawing the remainder of the lines in the next frame on the sheet in the remainder of the area in which the next frame is to be drawn.

1 Claim, 7 Drawing Sheets

METHOD OF CONNECTION DRAWING IN AUTOMATIC DRAFTER

BRIEF SUMMARY OF THE INVENTION

This invention relates to a method of connecting parts of a long drawing in an automatic drafter.

The conventional operation of connecting parts of a long size drawing as shown in FIG. 5 drawn by an automatic drafter as shown in FIG. 3 is carried out in a manner as shown in FIGS. 8 and 9, in which when an operation of drawing of the first frame on a roll of paper 2 is completed, hard clips of the next or second frame and the preceding first frame are matched, and then an operation of drawing of the second frame is carried out, during which the first frame and the second frame are connected, and an operation of drawing of the next or third frame is carried out in the manner described above. As explained above, the drawing is carried out on the roll of paper 2 in such a manner that the data for the long size drawing is divided into a plurality of frames and as the data is used for controlling the automatic drafter, the successive frames are mutually connected. The above drawing operation, as shown in the flow diagram of FIG. 8, is started by the automatic drafter executing a paper initial (block 1). Next, the hard clip area in which the first frame is to be drawn is determined (block 2) by the result of the paper initial.

Next, only the data for the first frame having length Lx is drawn in the hard clip area obtained in the block 2 (block 3). When the operation of drawing of the first frame is completed (block 4), the controller for the automatic drafter causes the first frame to be taken up on a take-up shaft 18 (see FIG. 3) (block 5). Next, the second frame is drawn out from the supply roll 19 (block 6). Then, the hard clip area is reset, and the second frame is set (block 7). The size Lx of the second frame is identical with the first frame as set in the second block. Then, only the data for the second frame is drawn in the hard clip area for the second frame (block 8).

After the operation of drawing of the second frame is completed (block 9), the blocks 5 through 9 are repeated for the succeeding frames through the final frame as shown in FIG. 9, to produce the long size drawing as is shown in FIG. 5.

When the hard clip areas corresponding to each frame are connected, a line component L extending between the two frames across the connecting portion doe not have the trailing end LE in the preceding frame and the leading end LS in the current frame connected satisfactorily as shown by the enlarged scale line in FIG. 4. This is because when the line is drawn with a pen, a gradually increasing width portion occurs in a range of about 1 millimeter to 2 millimeters in the leading end portion LS which causes the line to be blurred at the junction of the two frames.

An object of this invention is to eliminate the foregoing drawback.

DESCRIPTION OF THE PREFERRED EMBODIMENT

Figure 1:
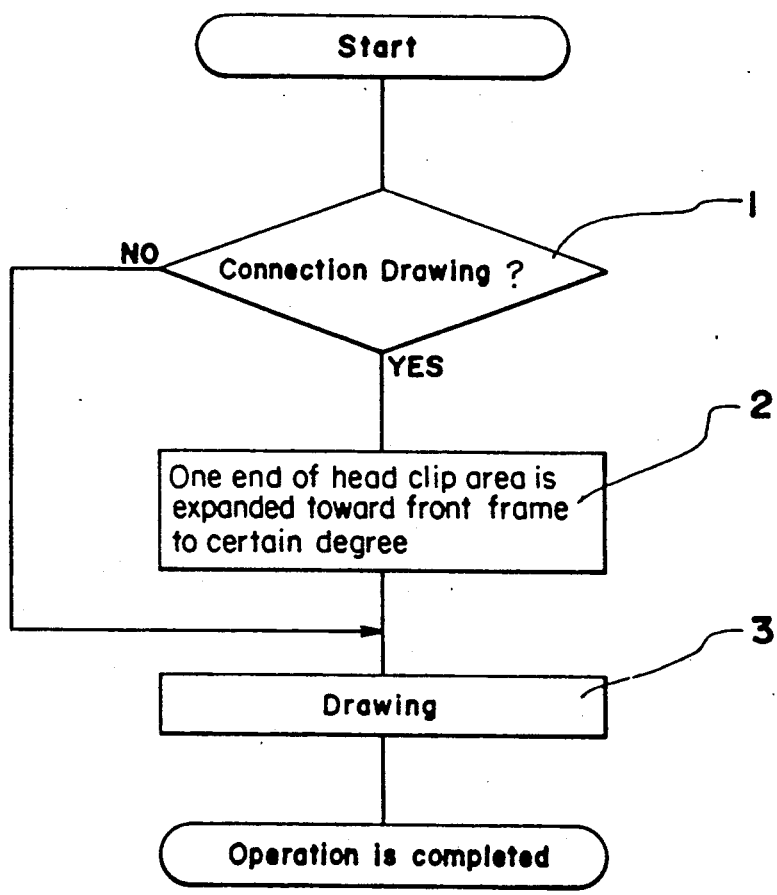
FIG. 1 is a flow chart showing generally the operation of the automatic drafter according to the present invention.

The present invention will be described in the following by referring to the embodiments illustrated in the drawings.

Figure 3:
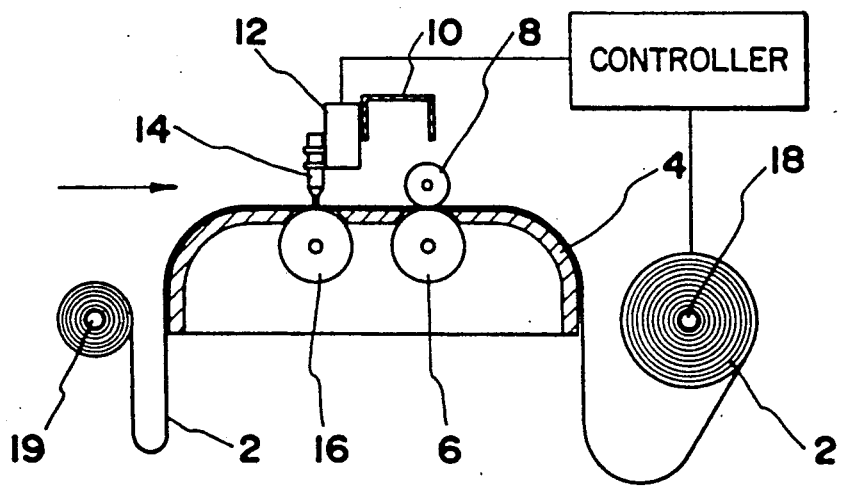
FIG. 3 is a diagrammatic drawing of an automatic drafter for carrying out the present invention.
Figure 4:
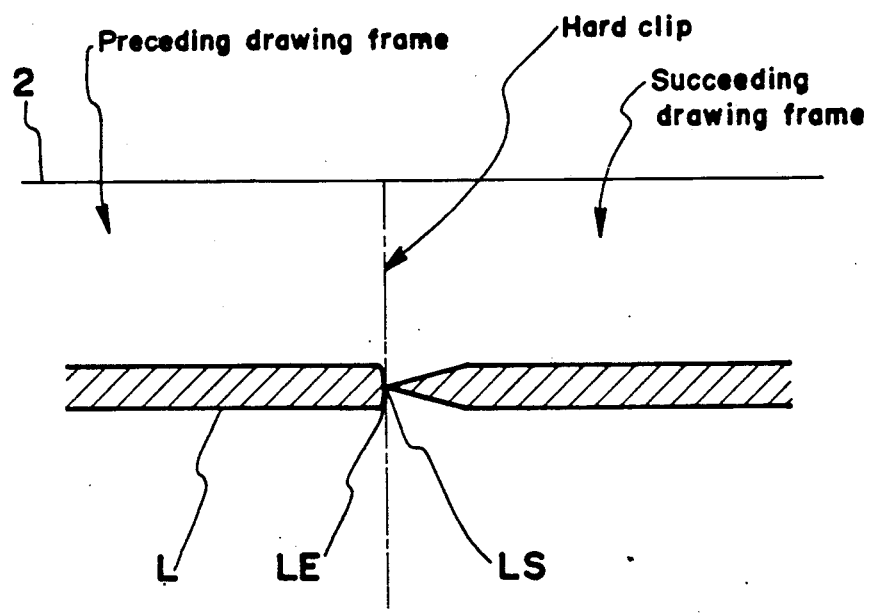
FIG. 4 is a diagram on an enlarged scale of a line of a long drawing extending over a junction between two frames.
Figure 5:
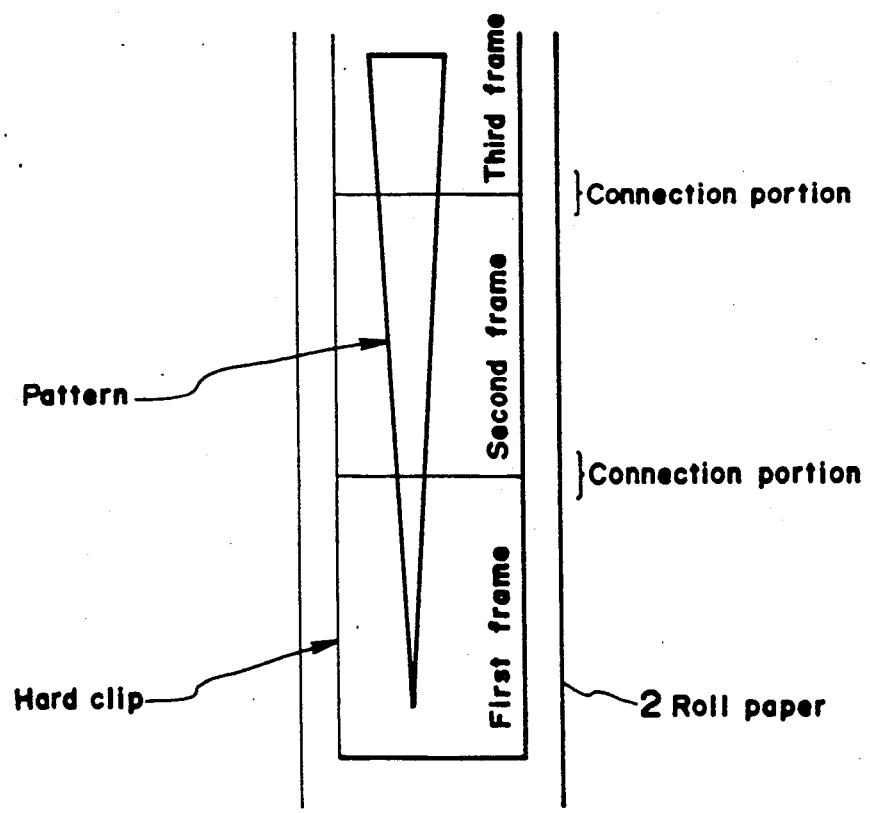
FIG. 5 is a diagrammatic drawing of a long drawing of the type to which the present invention is applicable.

FIG. 3 shows a conventional paper drive type automatic drafter that performs the operation of drawing successive frames of a long drawing continually on a strip of paper 2 from a supply roll 19.

Figure 2:
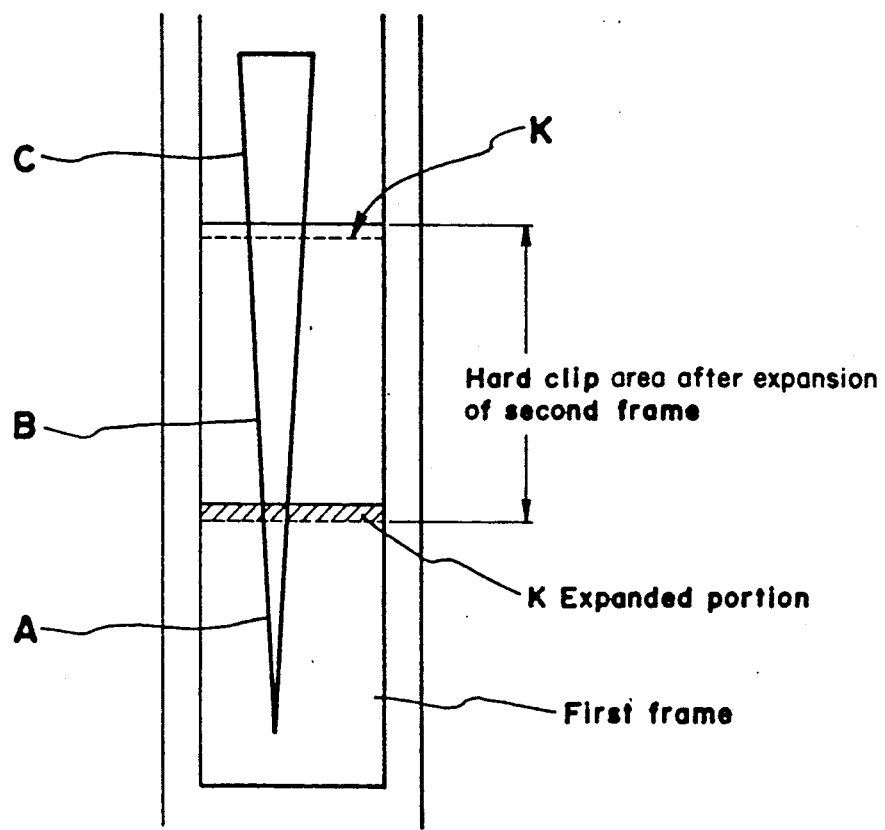
FIG. 2 is an explanatory drawing of a long drawing prepared according to the present invention.

The roll of paper 2 spread on a platen 4 is gripped between a drive roller 6 and a holding roller 8. The roll of paper 2 is fed in a direction back and forth on the platen 4 in a range of length corresponding to one drawing frame. In addition, the controller of the automatic drafter feeds a pen 14 mounted on a pen head 12 along a Y rail 10 above a drawing roller 16 in a direction perpendicular to the feeding direction of the roll of paper 2 for performing the operation of drawing each frame on the roll of paper 2. The controller of the automatic drafter feeds the roll of paper 2 in the direction of a take-up shaft 18 by a length corresponding to the one frame on the platen 4 when the operation of drawing of the first frame is completed, and develops and positions the blank surface of the roll of paper 2 on the platen 4. Then the controller of the automatic drafter, as shown in FIG. 1, discriminates whether or not the connected drawing is formed in the discriminating step of block 1, and if yes is obtained, the one end of the hard clip area setting of the range of the operation of drawing of the second frame is moved longitudinally of the strip (block 2) so as to cause the hard clip area for accommodating the second frame to expand so that the expanded portion K is superposed on or overlapped with the preceding frame, and as shown in FIG. 2, width of the overlapping portion being set to have a width of 2–3 mm or 3–5 mm. Then the automatic drafter starts the operation of drawing the lines of the second frame by redrawing the lines in the vicinity of the trailing end of the preceding frame which are to extend across the junction between successive frames in the expanded portion K of the hard clip area, and then continues said lines in the second frame while drawing the remainder of the lines in the second frame (block 3) by drawing in the remainder of the hard clip area for the second frame. Thus the portion of the preceding frame is drawn twice in the expanded portion K of the hard clip area, once at the end of the first drawing frame and again at the start of the drawing of the second frame. As described above, the operation of drawing is carried out in such a manner that the drawings A, B, C are connected by twice drawing the lines at the trailing end of the preceding frame, the second time being in the expanded portion K of the hard clip area for the frame currently being drawn.

Figure 6:
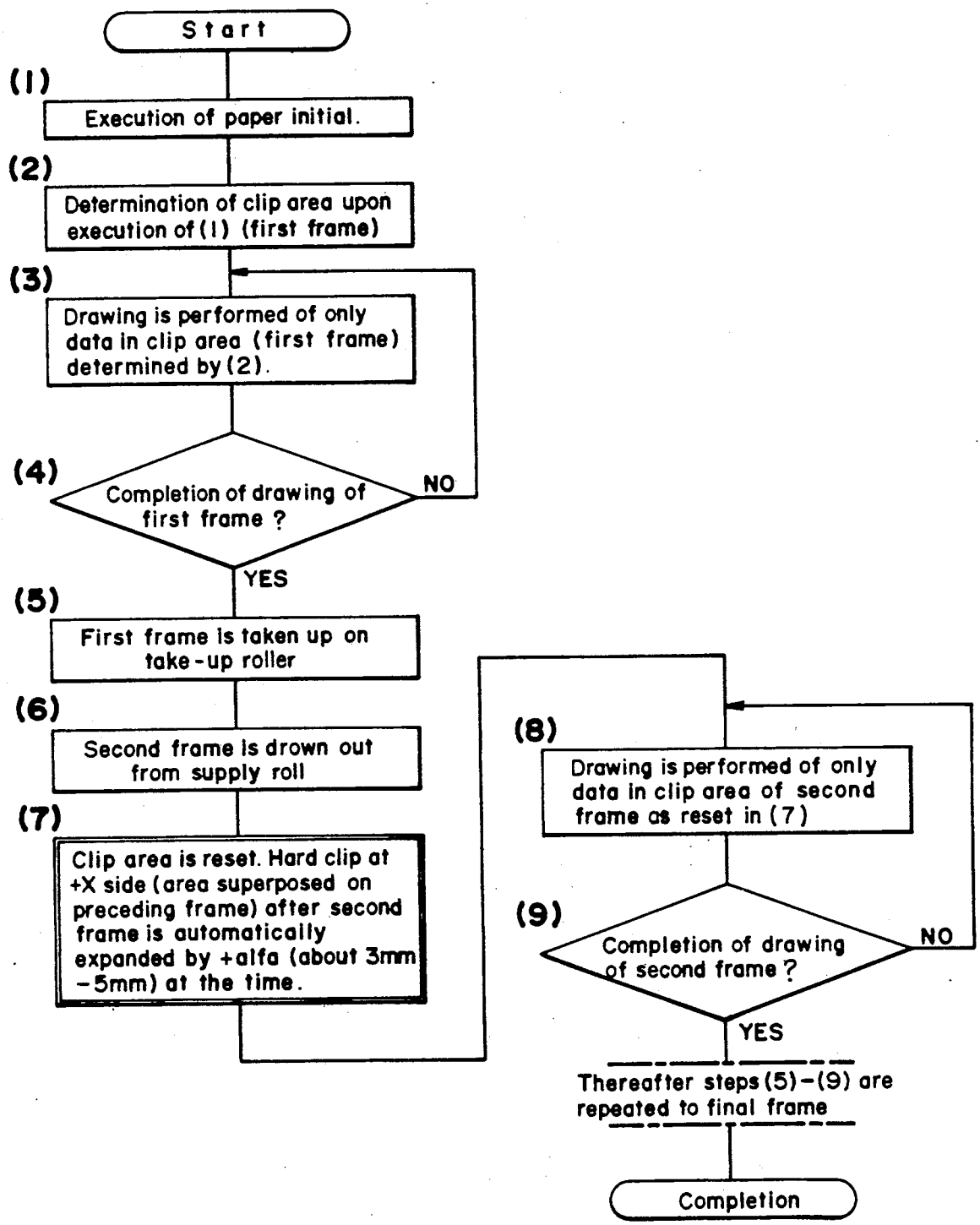
FIG. 6 is a flow chart of the operation of the drafter according to the present invention.
Figure 7:
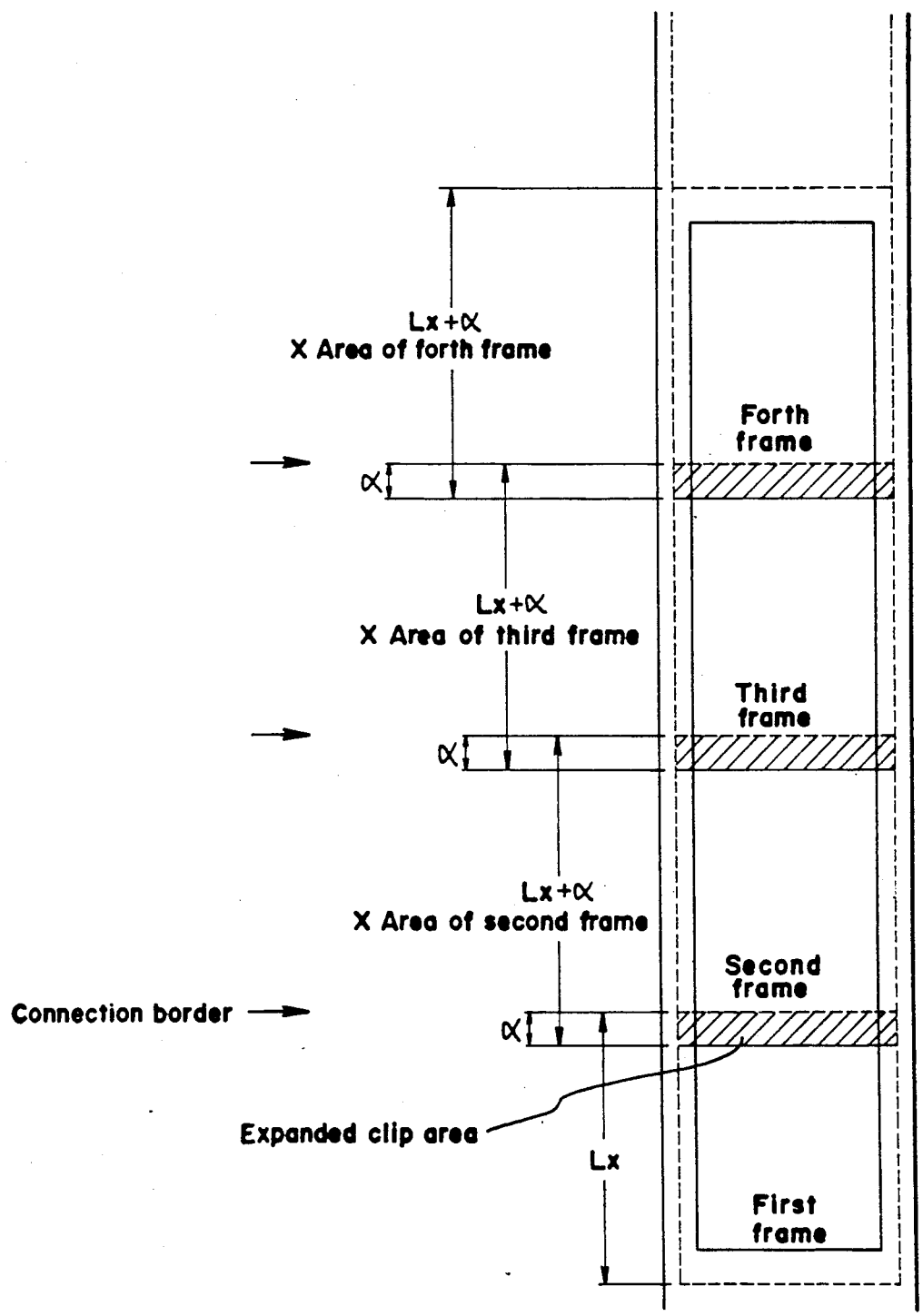
FIG. 7 is a diagrammatic drawing of a drawing produced according according to the present invention.
Figure 8:
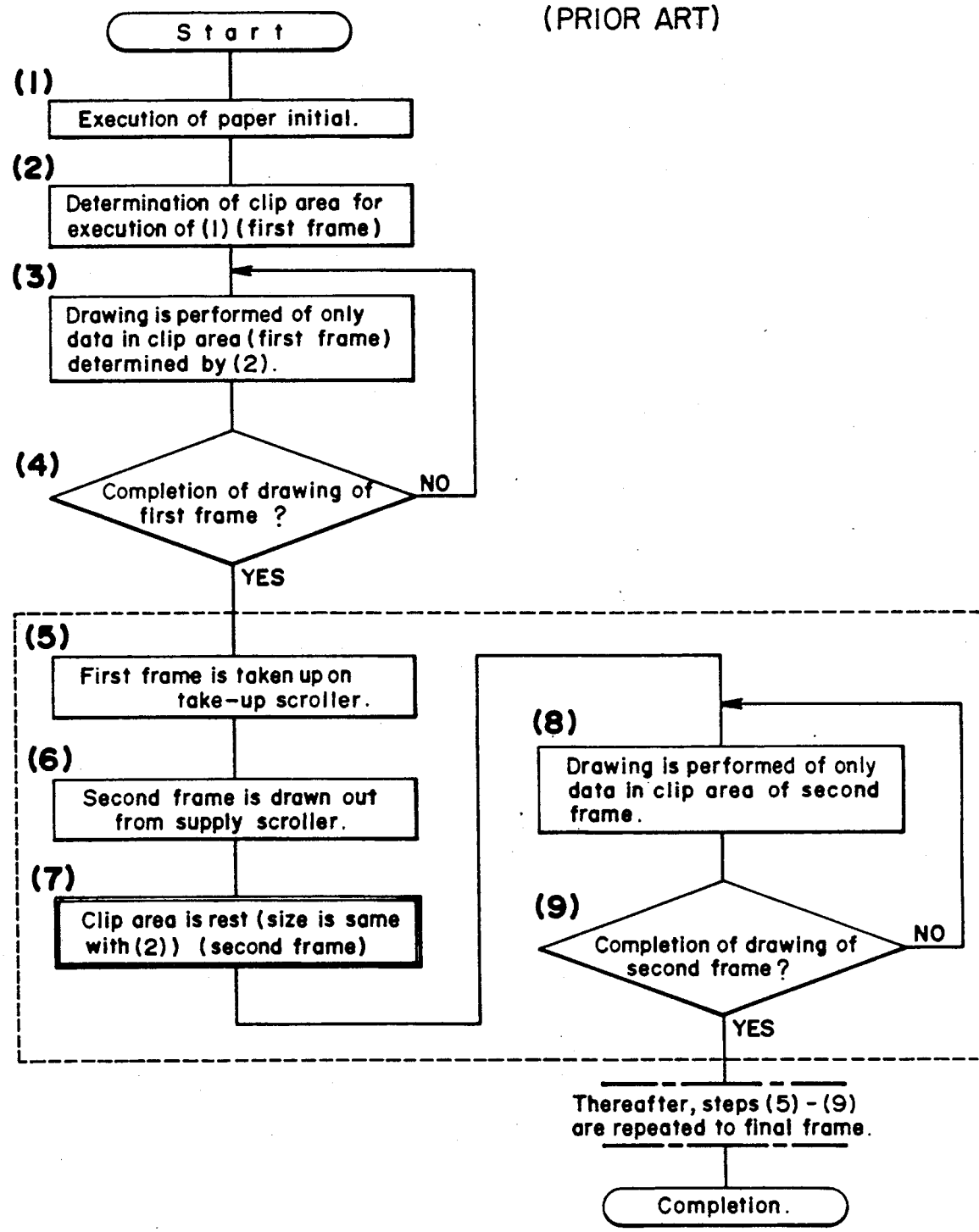
FIG. 8 is a flow chart of the operation of the drafter according to the prior art.
Figure 9:
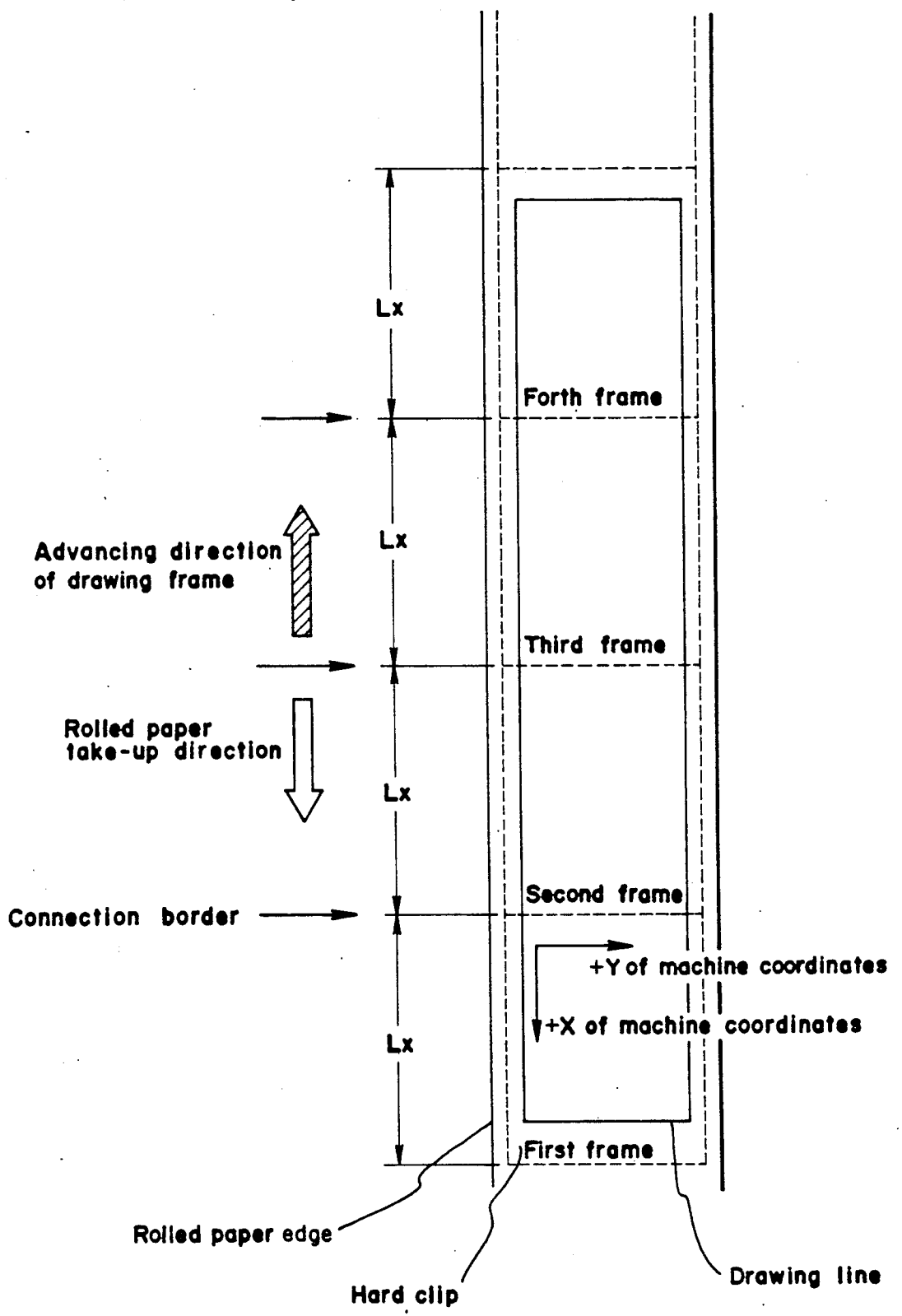
FIG. 9 is a diagrammatic drawing of a drawing produced according to the prior art.

The foregoing operation will be described further by referring to FIGS. 6 and 7.

The controller of the automatic drafter first feeds the strip of paper 2 on the platen 4 back and forth in the longitudinal direction of the strip at a high speed and a predetermined distance and a predetermined number of times to execute the paper initial when the drawing operation is started (block 1). Next, the controller determines (block 2) the longitudinal range Lx of the hard clip area for accommodating the first frame. The drawing operation (block 3) for only the data for the first frame is then performed in the hard clip area obtained in block 2. When the first frame is finished and taken up (block 5) on the take-up shaft 18, the part of the strip for the second frame is drawn (block 6) from the supply roll 19. Next, the controller resets the hard clip area in the step in block 7. At this time, the leading edge of the hard clip area is moved $+\alpha$ (about 3 mm to 5 mm) toward the preceding, or first, frame to provide an expanded area superposed on the preceding frame. Thus, the longitudinal range of the hard clip area for the second frame becomes $Lx+\alpha$.

Next, the drawing operation (block 8) of the data in the reset hard clip area for the second frame is performed in the manner described above, i.e. by repeating tie lines in the overlapped area corresponding to $\alpha$ and then drawing the lines in the remainder of the hard clip area for the second frame. Next, whether or not the drawing operation of the second frame is completed is discriminated (block 9), and if so, the blocks 5-9 are repeated up to the final frame.

As described in the foregoing, this invention has the effect that a line crossing the connected portions of the long drawing can be uniformly drawn by drawing a portion where each frame is connected to the preceding frame twice during the drawing operation.

What is claimed is:

1. In a method of operating an automatic drafter for producing a long drawing having successive parts, the improvement comprising:

after drawing on a long sheet a preceding frame of the drawing corresponding to a preceding part of the long drawing, expanding the area in which the next frame is to be drawn by moving the leading edge of the area to form a portion overlapping the trailing portion of the preceding frame; and redrawing on said sheet the lines of the trailing portion of the preceding frame which are to extend across the junction between the successive parts of the sheet in said overlapping portion and then continuing said lines in said next frame while drawing the remainder of the lines in the next frame on the sheet in the remainder of the area in which the next frame is to be drawn.

* * * * *